(12) United States Patent
Cheung

(10) Patent No.: US 9,808,779 B2
(45) Date of Patent: Nov. 7, 2017

(54) HAND-HELD BLENDER

(71) Applicant: Huiyang Allan Plastic & Electric Industries Co., Huizhou (CN)

(72) Inventor: Shu Sang Cheung, Hong Kong (HK)

( * ) Notice: Subject to any disclaimer, the term of this patent is extended or adjusted under 35 U.S.C. 154(b) by 505 days.

(21) Appl. No.: 14/595,352

(22) Filed: Jan. 13, 2015

(65) Prior Publication Data
US 2015/0375184 A1    Dec. 31, 2015

(30) Foreign Application Priority Data

Jun. 30, 2014  (CN) .................. 2014 1 03039959

(51) Int. Cl.
  *A47J 43/044*  (2006.01)
  *B01F 13/00*   (2006.01)
  *B01F 15/00*   (2006.01)

(52) U.S. Cl.
  CPC .......... *B01F 13/002* (2013.01); *A47J 43/044* (2013.01); *B01F 15/00538* (2013.01); *A47J 2043/04427* (2013.01); *B01F 2215/0014* (2013.01)

(58) Field of Classification Search
  CPC ..................................... A47J 43/044
  USPC .................................. 366/129, 601
  See application file for complete search history.

(56) References Cited

U.S. PATENT DOCUMENTS

| 1,489,182 | A  | * | 4/1924 | Weinberg | A47J 43/044 |
|---|---|---|---|---|---|
|  |  |  |  |  | 174/46 |
| 2005/0078549 | A1 | * | 4/2005 | Hamelin | A47J 43/0711 |
|  |  |  |  |  | 366/129 |
| 2015/0009776 | A1 | * | 1/2015 | Cheung | A47J 43/082 |
|  |  |  |  |  | 366/129 |

* cited by examiner

*Primary Examiner* — David Sorkin
(74) *Attorney, Agent, or Firm* — Prakash Nama; Global IP Services, PLLC

(57) ABSTRACT

The invention discloses a hand-held blender including a handle, a motor, a switch for controlling the motor, an input shaft configured to rotate synchronously with the rotor of the motor, and an output shaft configured for outputting power to the stirring part. The motor and the switch are arranged in the handle. The output shaft is coaxially arranged under the input shaft. A deceleration component and output connectors are arranged between the input shaft and the output shaft. An active connector and a shift lever are sleeved on the output shaft, and the active connector is controlled by the shift lever so that the active connector can move up and down to selectively joint with different output connectors. The invention is convenient and reliable to change stirring speed in a manner that the active connector is controlled by the shift lever.

10 Claims, 6 Drawing Sheets

HAND-HELD BLENDER

BACKGROUND OF THE INVENTION

1. Field of the Invention

The present invention relates to the field of food blending machine, in particular to a hand-held blender which can joint with different stirring parts and output different kinds of speed.

2. Description of Related Art

Hand-held food blenders become more and more popular because of the compact size and convenience. Most of hand-held blenders have only one kind of stirring speed. Nutritional ingredient of the food may be destroyed because some hand-held blenders work in a high stirring speed. However food is difficult to be stirred uniformly because some hand-held blenders work in a low stirring speed, which causes time consuming and low working efficiency. Therefore, blenders with only one kind of stirring speed can not meet different demands for different food. And then blenders with at least two kinds of speeds appear in the market, and some blenders change speed by changing voltage, but changing speeds by voltage is unstable. In order to reduce fatigue of the users, the dimensions of the hand-held blender is designed to be small, so changing speed through mechanism becomes a problem.

At present, the hand blenders in market have single function, and almost only have one kind of chopping or blending function. If other functions are required, more kinds of appliances are required, such as eggbeater for whisking eggs, mashed potatoes machine for mashing potatoes etc. Therefore hand-held blenders with multifunction and at least two kinds of output speeds are urgently needed in the market. And the manner of speed conversion is required to be rapid and reliable.

BRIEF DESCRIPTION OF THE SEVERAL VIEWS OF THE DRAWING(S)

The foregoing and other exemplary purposes, aspects and advantages of the present invention will be better understood in principle form the following detailed description of one or more exemplary embodiments of the invention with reference to the drawings, in which.

DETAILED DESCRIPTION OF THE INVENTION

Figure 1:
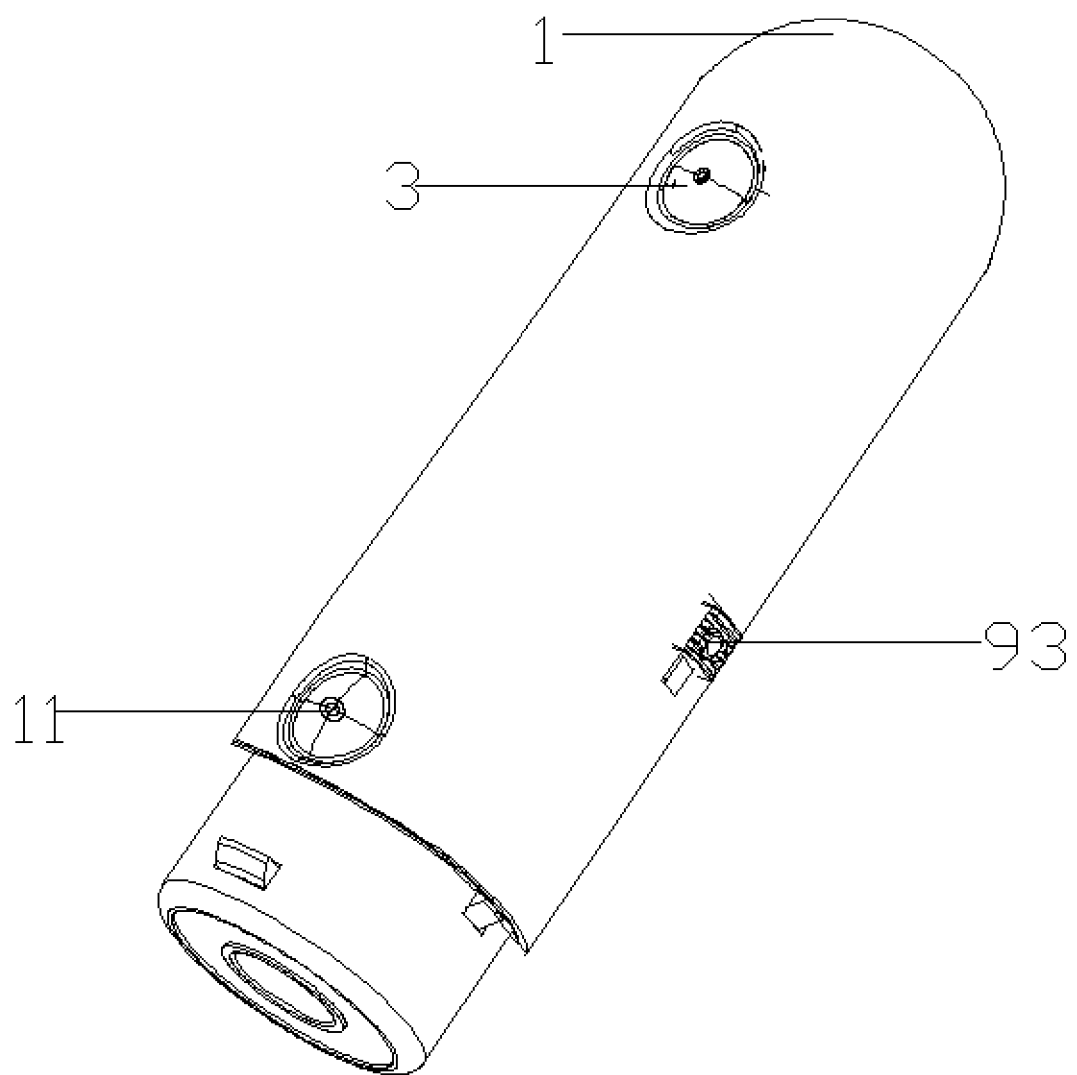
FIG. 1 is a perspective view of a hand-held blender of the present invention.
Figure 2:
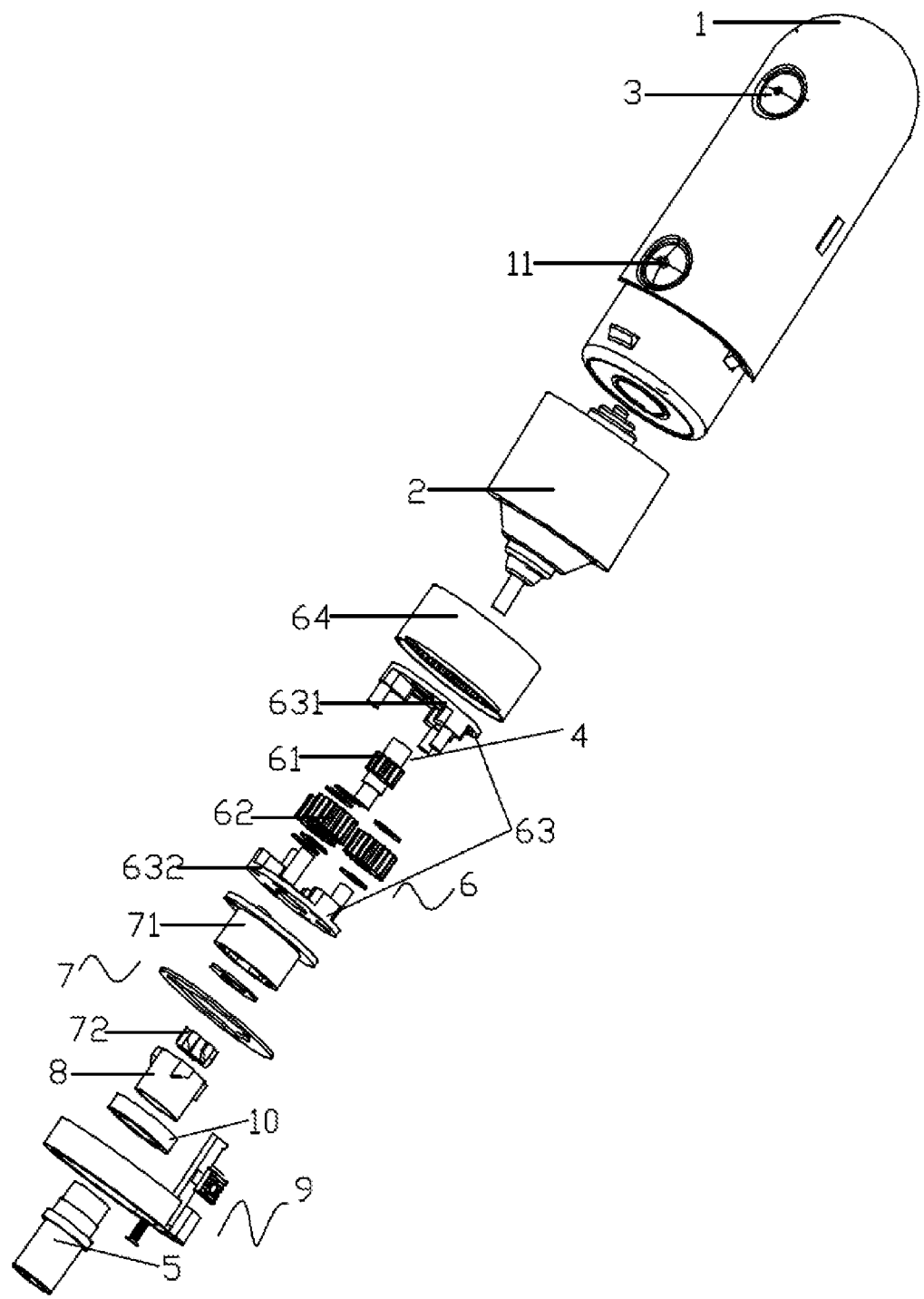
FIG. 2 is an exploded view of the hand-held blender.
Figure 3:
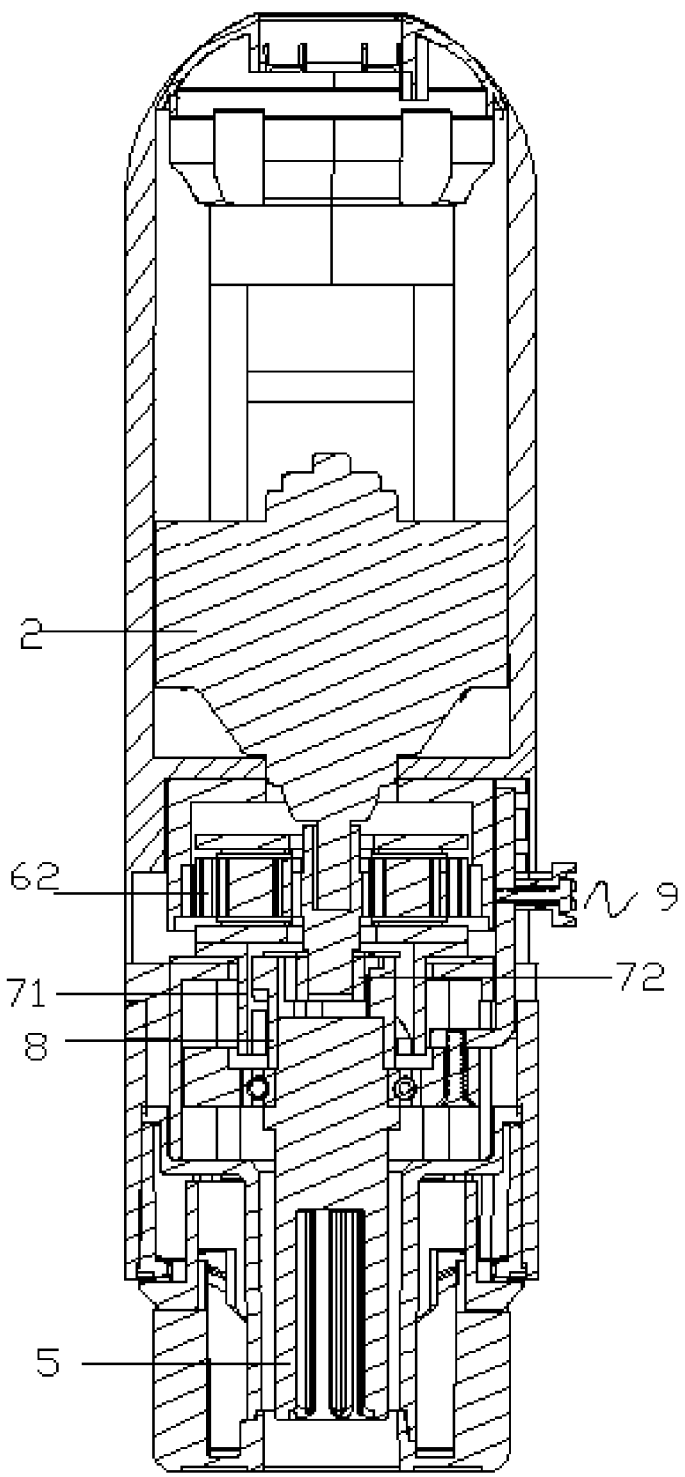
FIG. 3 is a cross-section view of the hand-held blender.
Figure 4:
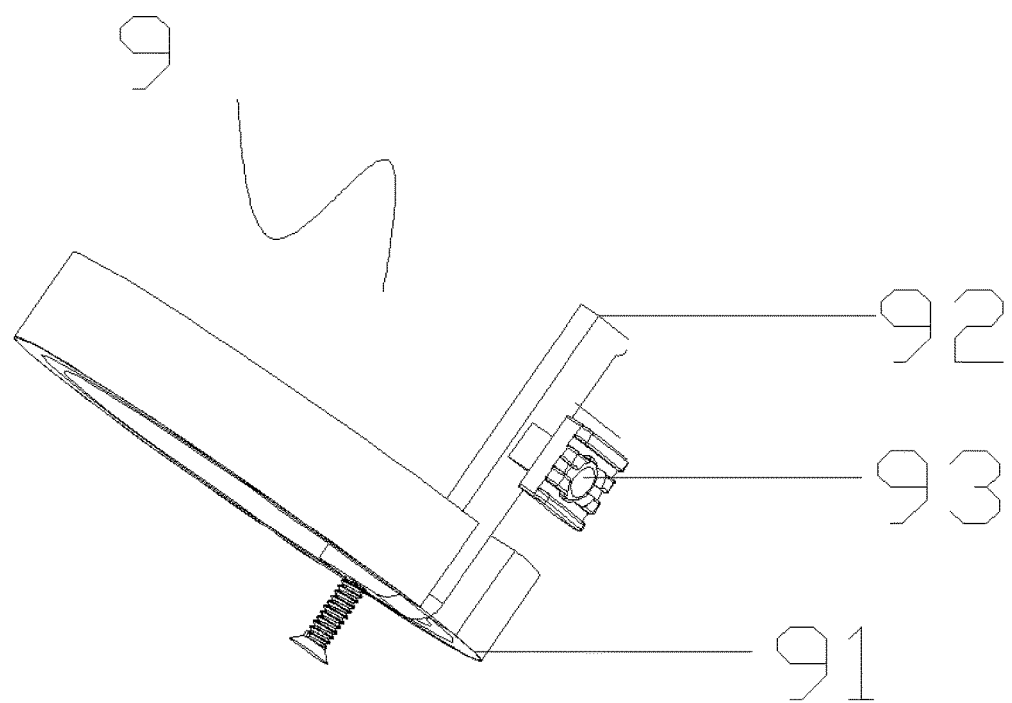
FIG. 4 is a perspective view of a shift lever of the hand-held blender.
Figure 5:
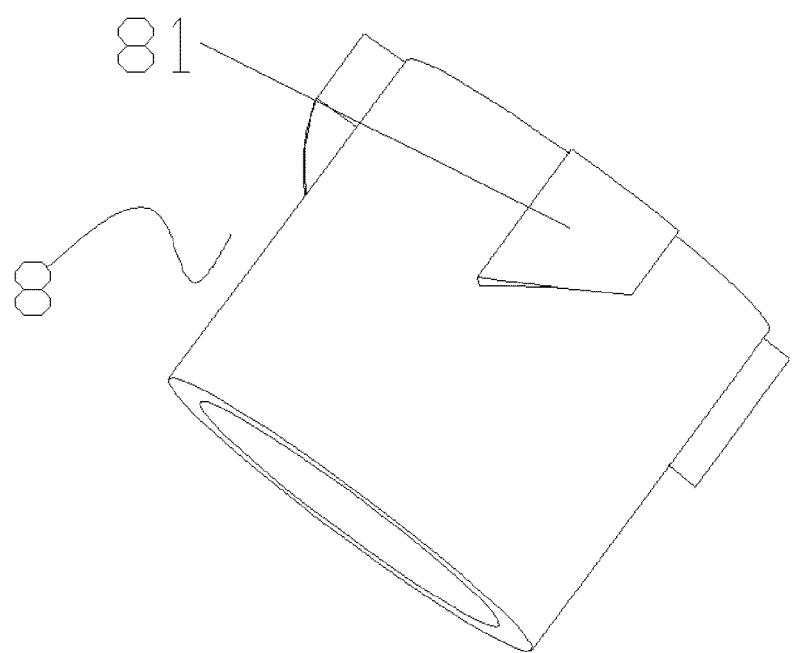
FIG. 5 is a perspective view of an active connector of the hand-held blender.
Figure 6:
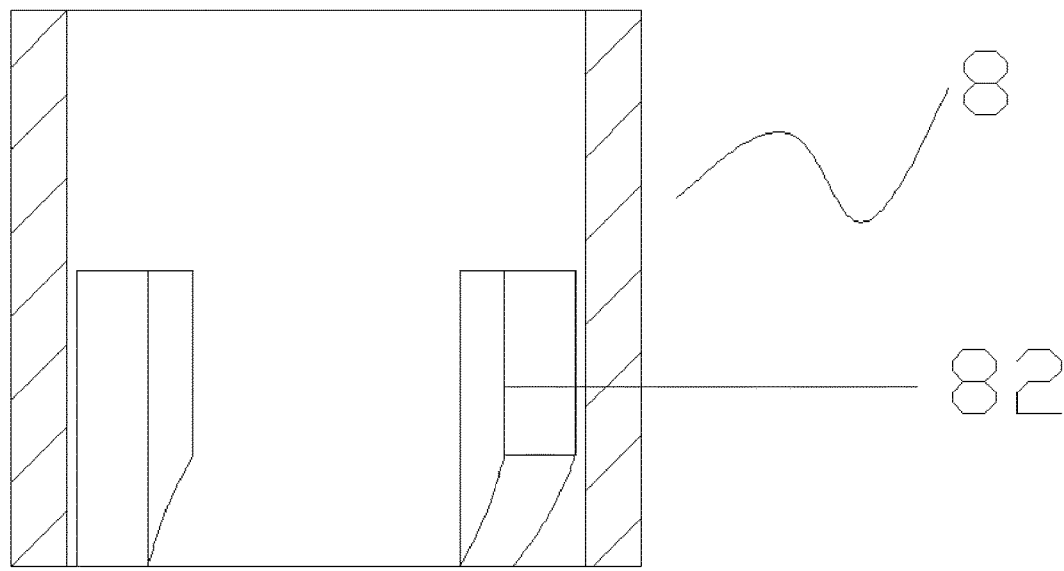
FIG. 6 is a cross-section view of an active connector of the hand-held blender.
Figure 7:
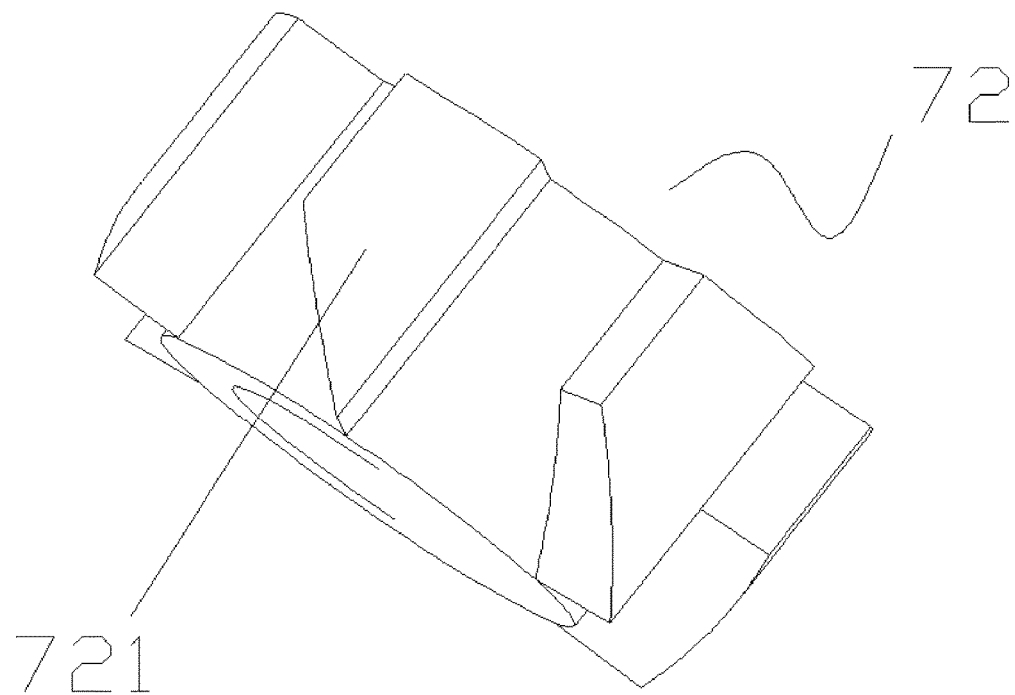
FIG. 7 is a perspective view of a high speed output connector of the hand-held blender.
Figure 8:
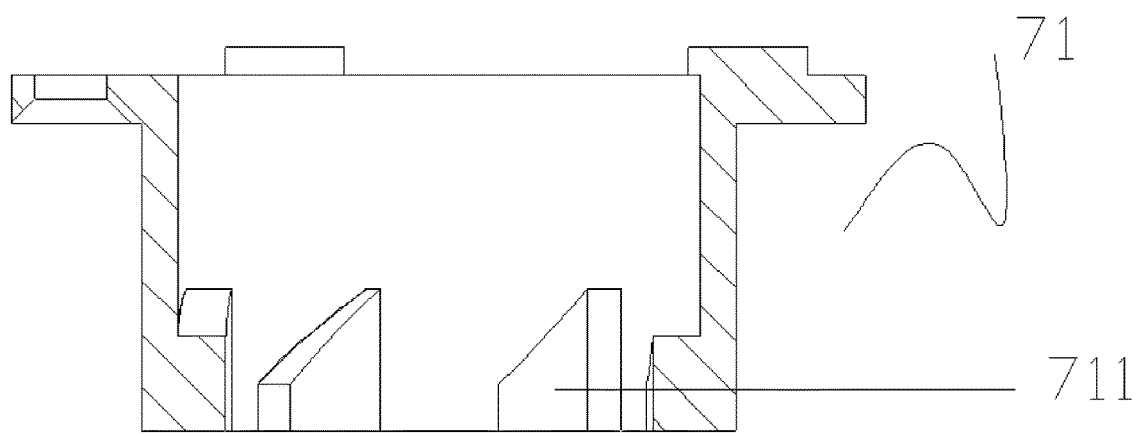
FIG. 8 is a cross-section view of a low speed connector of the hand-held blender.

The invention will now be described in detail through several embodiments with reference to the accompanying drawings.

A hand-held blender includes: a handle 1; a motor 2 arranged in the handle 1; a switch 3 for controlling the motor to work, which is arranged on the handle; an input shaft 4 configured to rotate synchronously with the rotor of the motor; and an output shaft 5 for outputting power to the stirring part. The output shaft 5 is coaxially arranged under the input shaft. A deceleration component 6 and output connectors 7 are arranged between the input shaft 4 and the output shaft 5. An active connector 8 and a shift lever for controlling the active connector to move up and down are sleeved on the output shaft 5. The shift lever 9 is capable of moving up and down, which enables the active connector 8 to choose different output connectors 7.

The output connectors 7 include a low speed output connector 71 which is fixedly arranged under the lower planet carrier 632 and a high speed output connector 72 which is coaxially arranged on the output shaft 5. The vertical height of the high speed connector 72 is less than the vertical height of the low speed connector 71, so the high speed connector 72 is installed in the upper part of the low speed connector 71. The shift lever 9 includes a hollow ring 91 arranged to be coaxial with the output shaft 5 and a rod 92 which is perpendicular to the hollow ring. An embossment 93 is arranged on the rod 92 so that the rod 92 can move conveniently. One end of the embossment 93 extends out of the handle. The active connector 8 controlled by the shift lever 9 can selectively engage with the high speed connector 72 or the low speed connector 71. The hollow ring 91 is fixedly arranged on the output shaft through a bearing 10, and the inner ring of the hollow ring 91 is fixedly connected with the outer ring of the bearing 10. The inner ring of the bearing 10 is fixed on the output shaft, and the active connector 8 is arranged above the bearing 10 and fixed on the output shaft. The upper part of the outer ring of the active connector 8 is equipped with the external teeth 81, and the lower part of the inner ring of the low speed connector 71 is equipped with internal teeth 711 which are matched with the external teeth 81 of the active connector 8. The external teeth 81 of the active connector engage with the internal teeth 711 of low speed connector. The lower part of the inner ring of the active connector 8 is equipped with internal teeth 82, and the outer ring of the high speed connector 72 is equipped with the external teeth 721 which is matched with the internal teeth 82 of the active connector. The internal teeth 82 of the active connector 8 engage with the external teeth 721 of the high speed connector.

The deceleration component 6 include a centre gear 61 which is sleeved on the input shaft and rotates synchronously with the input shaft, a planetary gear set 62 engaging with the periphery of the centre gear 61, and planet carriers 63 used for fixing the planetary gear set. The planetary gear set 62 is constituted by 3 to 6 planet gears. The planet carriers 63 include an upper planet carrier 631 which is installed above the planetary gear set, and a lower planet carrier 632 which is installed below the planetary gear set. The planetary gear set 62 is fixed by the upper planet carrier 631 and the lower planet carrier 632. A sun gear 64 rotating cooperatively with the planetary gear set and arranged around the periphery of the planetary gear set 62. The input shaft 4, the output shaft 5 and the centre gear 61 are arranged coaxially. Some gears can be added below the deceleration component based on the circumstances, so the output speed can realize two kinds of speed or more.

The low speed connector 71 is fixedly arranged on the lower surface of the lower planet carrier 632, and the low speed connector 71 drives the output shaft 5 to rotate in a low speed after slowed down by the deceleration component 6, and finally the output shaft 5 output low stirring speed. The high speed connector 72 sleeved on the output shaft, and without slowed down by the deceleration component 6, the high speed connector 72 can transfer the power of motor to the output shaft 5 directly, finally the output shaft 5 output high stirring speed. According to the height difference between the high speed connector 72 and the low speed connector 71, the speed conversion can be realized by the movement of the shift lever 9, and the same stirring part at least has two kinds of speed, so the manner of speed conversion is simple and reliable.

A movable button 11 is arranged on the handle to control the locking or unlocking states between the handle and the stirring part. The movable button 11 is configured to make the handle assemble with different stirring part, such as stirrer, eggbeater, mashed potatoes blender etc, so a hand-held blender with multifunction can be realized, and the stirring part is able to be changed simply, and is simple to be operated, and convenient to be cleaned.

The detailed working mode is: moving up the shift lever 9, the output shaft 5 fixedly arranged with the shift lever 9 moves upward, at the same time the active connector 8 fixedly arranged on the shift lever also moves upward, then the external teeth of the active connector 8 engage with the internal teeth of the lower part of the low speed output connector 71, the slow speed output connector 71 fixedly joint with the active connector 8, the output shaft 5 outputs low stirring speed after slowed down by the deceleration component 6. Moving up the shift lever 9 continually, the active connector 8 moves to the upper part of the inner ring of the low speed output connector 71, at this time the active connector 8 do not engage with the low speed output connector 71, the internal teeth of the active connector 8 is matched with the external teeth of the high speed output connector 72, the active connector 8 engages with the high speed output connector 72, finally the output shaft 5 outputs high stirring speed without slowed down by the deceleration component 6.

The invention provides a hand-held blender, which can change stirring speed conveniently and reliably in the manner that the active connector 8 is controlled by the shift lever. The hand-held blender outputs at least two kinds of stirring speed for the installation of the deceleration component 6 and the speed conversion between the high speed and the low speed is realized by the control of shift lever. The hand-held blender can be assembled with different stirring part, such as stirrer, eggbeater, mashed potatoes blender etc, by the movable button arranged on the handle, so a hand-held blender with multifunction can be realized. All components are installed inside the handle so the structure is compact, and the size of the hand-held blender is small, which can save storage space, because all components are arranged in the handle. The handle and the stirring part are connected separably, so it is convenient to change different stirring part, and it is simply to operate and easy to clean.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A hand-held blender, comprising:
    a handle;
    a motor configured in the handle;
    a switch configured on the handle and for controlling the motor;
    an input shaft configured to rotate synchronously with a rotor of the motor;
    an output shaft configured for outputting power to a stirring tool, and coaxially connected to a lower end of the input shaft; and
    a deceleration component and a plurality of output connectors arranged between the input shaft and the output shaft;
    wherein an active connector and a shift lever are sleeved on the output shaft; the active connector is controlled by the shift lever so that the active connector can move up and down to selectively joint with one of the output connectors.

2. The hand-held blender of claim 1, wherein the output connectors comprise a low speed output connector which is fixedly arranged under the deceleration component and a high speed output connector which is sleeved on the output shaft; the vertical height of the high speed output connector is less than the vertical height of the low speed output connector; the high speed output connector is located inside the low speed output connector.

3. The hand-held blender of claim 2, wherein the shift lever comprises a hollow ring coaxially arranged with the output shaft and a rod which is perpendicular to the hollow ring; an embossment is convenient to move which is arranged on the rod; one end of the embossment extends out of the handle; the hollow ring is fixedly arranged on the output shaft through a bearing; the inner ring of the hollow ring is fixedly jointed with the outer ring of the bearing, and the inner ring of the bearing is fixed on the output shaft; the active connector is arranged above the bearing and fixed on the output shaft.

4. The hand-held blender of claim 3, wherein the upper part of the outer ring of the active connector is equipped with external teeth, the lower part of the inner ring of the low speed connector is equipped with internal teeth which are matched with the external teeth of the active connector; the external teeth of the active connector engage with the internal teeth of the low speed output connector.

5. The hand-held blender of claim 4, wherein the lower part of the inner ring of the active connector is equipped with internal teeth, the outer ring of the high speed output connector is equipped with external teeth which are matched with the internal teeth of the active connector; the internal teeth of the active connector engage with the external teeth of the high speed output connector.

6. The hand-held blender of claim 5, wherein the deceleration component comprises a center gear which is sleeved on the input shaft and rotates synchronously with the input shaft, a planetary gear set engaged with the periphery of the center gear, and a planet carrier used for fixing the planetary gear set; a sun gear is arranged on the periphery of the planetary gear set and rotates with the planetary gear set.

7. The hand-held blender of claim 6, wherein the planet carrier comprises an upper planet carrier which is installed above the planetary gear set, and a lower planet carrier which is installed below the planetary gear set.

8. The hand-held blender of claim 7, wherein the planetary gear set is constituted by 3 to 6 planet gears.

9. The hand-held blender of claim 8, wherein the input shaft, the output shaft and the center gear are coaxially arranged.

10. The hand-held blender of claim 9, wherein a movable button is arranged on the handle so as to control locking or unlocking states between the handle and the stirring tool.

* * * * *